United States Patent [19]

Riser et al.

[11] Patent Number: 5,682,448
[45] Date of Patent: Oct. 28, 1997

[54] REFLECTOR AND ILLUMINATION SYSTEM

[75] Inventors: Andrew P. Riser, Romona, Calif.; Richard E. Albrecht, Durham, N.C.

[73] Assignee: Remote Source Lighting International, Santa Capustrano, Calif.

[21] Appl. No.: 645,327

[22] Filed: May 13, 1996

Related U.S. Application Data

[63] Continuation-in-part of Ser. No. 374,163, Jan. 17, 1995, Pat. No. 5,559,911.

[51] Int. Cl.$^6$ .................. G02B 6/26; G02B 5/10; F21V 7/04
[52] U.S. Cl. .................. 385/31; 385/33; 385/115; 385/119; 385/901; 362/32; 362/341; 362/347; 359/868
[58] Field of Search .................. 385/31, 33, 34, 385/115, 116, 119, 147, 901, 92, 93; 362/32, 341, 347, 346; 359/868

[56] References Cited

U.S. PATENT DOCUMENTS

| | | | |
|---|---|---|---|
| 4,050,784 | 9/1977 | Kobayashi | 385/34 X |
| 4,241,382 | 12/1980 | Daniel | 362/32 |
| 4,389,698 | 6/1983 | Cibie | 362/32 |
| 4,704,660 | 11/1987 | Robbins | 362/32 |
| 4,811,171 | 3/1989 | Viola | 362/32 |
| 4,811,172 | 3/1989 | Davenport et al. | 362/61 |
| 4,816,975 | 3/1989 | Bahnemann et al. | 362/308 |
| 4,851,969 | 7/1989 | Davenport et al. | 362/61 X |
| 4,868,718 | 9/1989 | Davenport et al. | 362/32 |
| 4,887,190 | 12/1989 | Sadamune et al. | 362/32 |
| 4,912,605 | 3/1990 | Whitehead | 362/32 |
| 4,922,385 | 5/1990 | Awai | 362/32 |
| 4,949,227 | 8/1990 | Finch et al. | 362/61 |
| 4,958,263 | 9/1990 | Davenport et al. | 362/32 |
| 4,961,622 | 10/1990 | Gorman et al. | 385/33 X |
| 5,096,281 | 3/1992 | Windebank et al. | 359/868 |
| 5,222,793 | 6/1993 | Davenport et al. | 385/32 |
| 5,259,056 | 11/1993 | Davenport et al. | 385/115 |
| 5,367,590 | 11/1994 | Davenport et al. | 385/901 X |
| 5,396,571 | 3/1995 | Saadatmanesh et al. | 385/33 |

FOREIGN PATENT DOCUMENTS

| | | | |
|---|---|---|---|
| 2651283 | 5/1978 | Germany | 362/32 X |
| 2098311 | 11/1982 | United Kingdom | 385/901 X |

*Primary Examiner*—Brian Healy
*Attorney, Agent, or Firm*—Donald E. Stout

[57] ABSTRACT

A light guide illumination system is provided for coupling light from an illumination source to a number of output "light guides", which are used for a variety of purposes, such as illuminating pools, spas, hazardous material zones, jail cells, and other applications where direct lighting is dangerous, difficult to maintain, or subject to vandalism. The illumination system employs an illumination reflector which has been customized to maximize the efficiency of light transmission between the illumination source, such as an arc lamp, and the cores of the output light guides. A method of fabricating the customized illumination reflector includes mapping the radiation patterns of the particular illumination source to be utilized, creating a database of those radiation patterns, and utilizing the database to generate an optimal illumination reflector configuration. The computer-generated reflector will virtually always be a non-conic section, because the illumination source is not ideal.

25 Claims, 2 Drawing Sheets

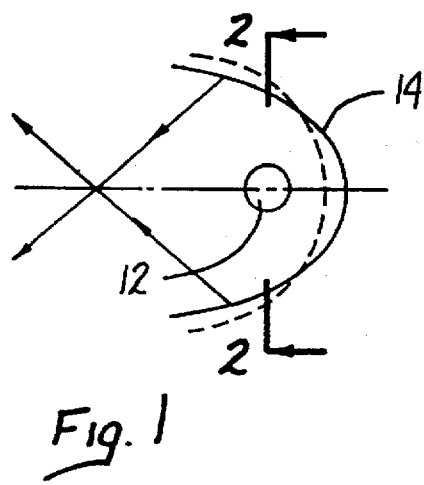
Fig. 1
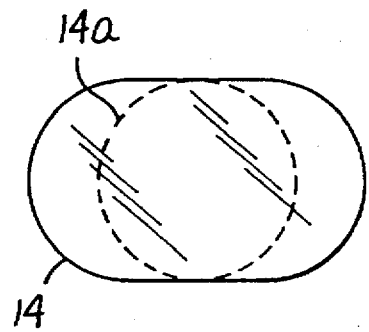
Fig. 2
Fig. 3
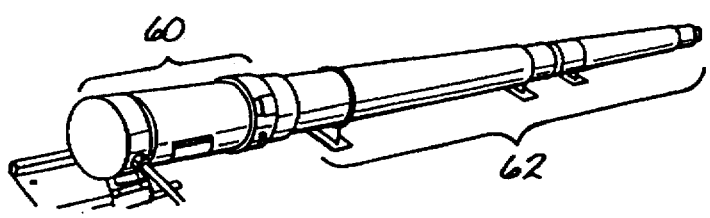
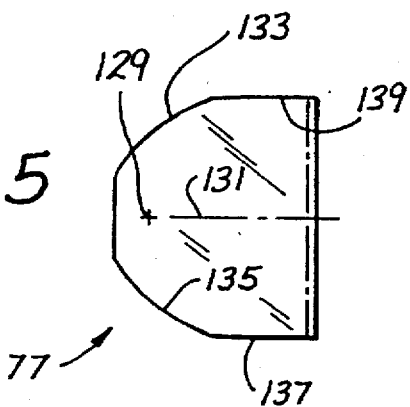
Fig. 5
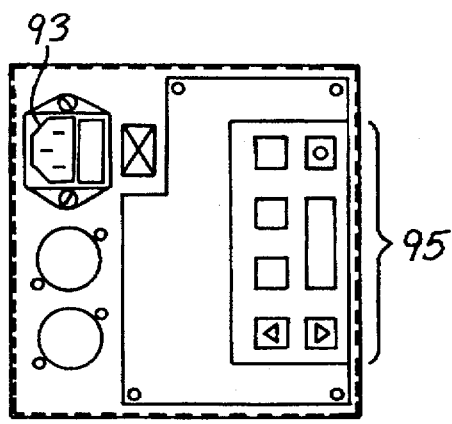
Fig. 4C

REFLECTOR AND ILLUMINATION SYSTEM

This application is a continuation-in-part of U.S. application Ser. No. 08/374,163 filed on Jan. 17, 1995 and entitled OPTICAL FIBER COUPLER USING SEGMENTED LENSES, which issued into U.S. Pat. No. 5,559,911 on Sep. 24, 1996; U.S. application Ser. No. 08/459,613 filed on Jun. 2, 1995, now pending, and entitled MULTIPORT ILLUMINATOR FOR MACRO-FIBERS; and U.S. application Ser. No. 08/599,970 filed on Feb. 14, 1996, now pending, and entitled OPTICAL COUPLER, all three of which are commonly assigned and the contents of which are expressly incorporated herein by reference. This application is related to U.S. application Ser. No. 08/645,324, filed on May 13, 1996, now pending, and entitled MULTIPORT ILLUMINATOR OPTIC DESIGN FOR MACRO-FIBERS; U.S. application Ser. No. 08/645,325, filed on May 13, 1996, now pending, and entitled MULTIPORT ILLUMINATOR MECHANICAL DESIGN FOR MACRO-FIBERS; and U.S. application Ser. No. 08/645,326, filed on May 13, 1996, now pending, and entitled REFLECTOR FOR ILLUMINATION SYSTEM, all three of which are commonly assigned and the contents of which are expressly incorporated herein by reference.

BACKGROUND OF THE INVENTION

Large diameter fiber optics, often referred to as "flexible light guides", are well known in the art, and typically comprise a single, solid core light guide which is surrounded by a cladding layer and a sheath or shielding layer. The core is the portion of a light guide which transmits light, and typically has a diameter of about 2 to 12 mm. It is formed of a very soft, semi-liquid plastic material, such as OPTIFLEX®, which is manufactured by Rohm & Haas Corporation, of Philadelphia, Pa. The cladding layer typically comprises polytetrafluoroethylene (PTFE or TEFLON®), or the like, while the outer sheath is fabricated of a material such as polyvinylchloride (PVC). Unlike small diameter optical fibers, which are typically used to transmit information in relatively complex control systems, these large diameter "light guides" are typically employed in a variety of illumination systems where direct lighting is difficult to maintain, dangerous, or subject to vandalism. Examples include architectural lighting, display cases, pools and spas (to eliminate electrical connections near water), hazardous material zones (to eliminate the need for sealed lighting), or jail cells. They are particularly advantageous in that only a single centralized illumination system must be maintained, rather than a plurality of individual lights.

One disadvantage of these prior art systems, however, is their use of an illumination reflector to transmit light between the source of illumination and the output optical fiber or guide. These conventional illumination reflectors are based upon classic conic sections; i.e. elliptical or parabolic reflectors. Such reflectors are best for "ideal" light sources; i.e. "point" sources, but for "real world" light sources, light transmission efficiency is reduced.

SUMMARY OF THE INVENTION

This invention is an improvement over the prior art described above, because it employs an illumination reflector which has been customized to maximize the efficiency of light transmission between the illumination source, such as an arc lamp, and the core of one or more output light guides. A method of fabricating the customized illumination reflector includes mapping the radiation patterns of the particular illumination source to be utilized, creating a database of those radiation patterns, and utilizing the database to generate an optimal illumination reflector configuration. The computer-generated reflector will virtually always be a non-conic section, because the illumination source is not ideal.

More particularly, an optical fiber illumination system for coupling light from an illumination source to a number of output light guides is disclosed. Each output light guide has a proximal end for receiving the light, and the illumination system includes an illumination reflector for receiving illumination from the illumination source and redirecting the illumination to the proximal end of each output light guide. The illumination reflector is particularly designed to complement the illumination source with which it is paired, and therefore has a computer-generated non-circular cross-section and is both non-elliptical and non-parabolic.

In another aspect of the invention, a method of fabricating an illumination reflector for an illumination system is disclosed. Steps in the method include mapping the radiation patterns of the illumination source, and creating a database of these radiation patterns. Then, the database is used to generate an illumination reflector configuration which provides an optimal distribution and intensity of illumination at a proximal end of each output light guide.

The present invention, together with additional features and advantages thereof, may best be understood by reference to the following description taken in connection with the accompanying illustrative drawings.

BRIEF DESCRIPTION OF THE FIGURES

FIG. 1 is a schematic top view of the present invention, illustrating an illumination source and an illumination reflector having a computer-generated curvature;

FIG. 2 is a cross-sectional view taken along lines 2—2 of FIG. 1, particularly illustrating the illumination reflector fabricated in accordance with the principles of the present invention;

FIG. 3 is a perspective view of the illumination system of the present invention;

FIGS. 4a–c are various views of the illumination source portion of the illumination system of the present invention; and FIG. 5 is a schematic view of the computer-generated illumination reflector of the presently preferred embodiment.

DETAILED DESCRIPTION OF THE PREFERRED EMBODIMENT

Referring now more specifically to the drawings, FIGS. 1 and 2 illustrate a source of illumination 12, comprising any conventional light source, such as an arc lamp or the like, and an illumination reflector 14, which reflects the light from the lamp to another optical component (not shown).

Turning to FIG. 3, a perspective view of the illumination system of the presently preferred embodiment is illustrated. The illumination system comprises a light source portion 60 and a delivery portion 62. The illumination system may be used for a variety of purposes, such as illuminating pools, spas, hazardous material zones, jail cells, and other applications where direct lighting is dangerous, difficult to maintain, or subject to vandalism.

Figure 4A:
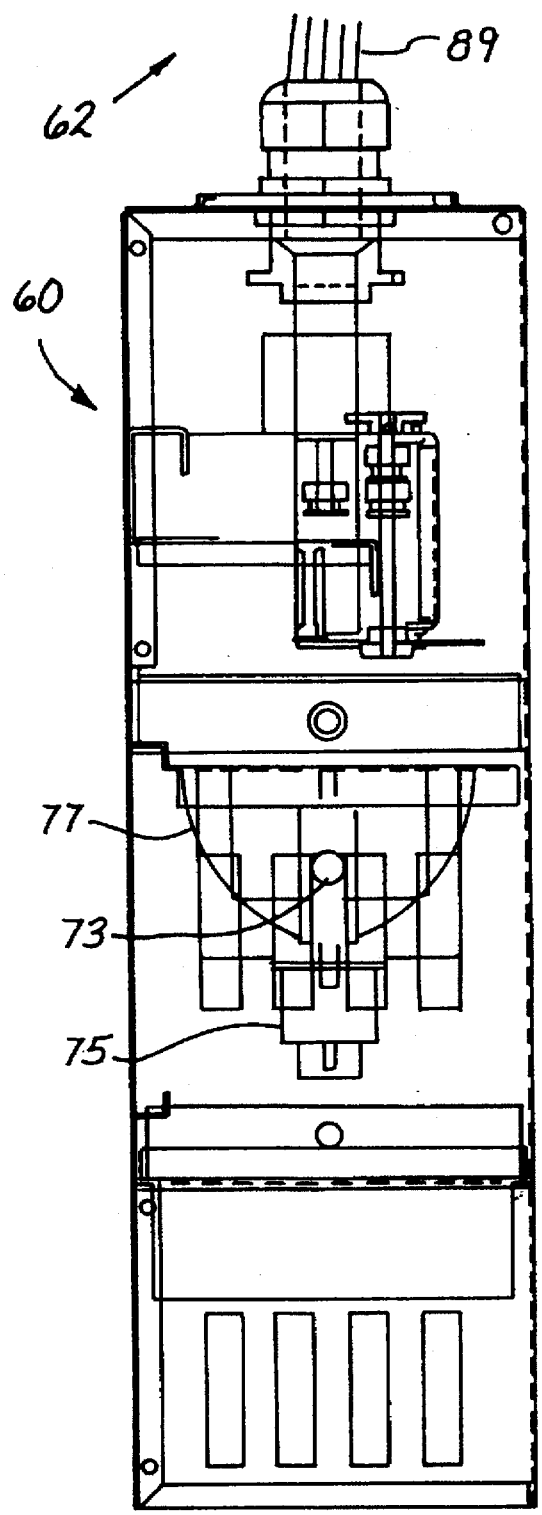
Figure 4B:
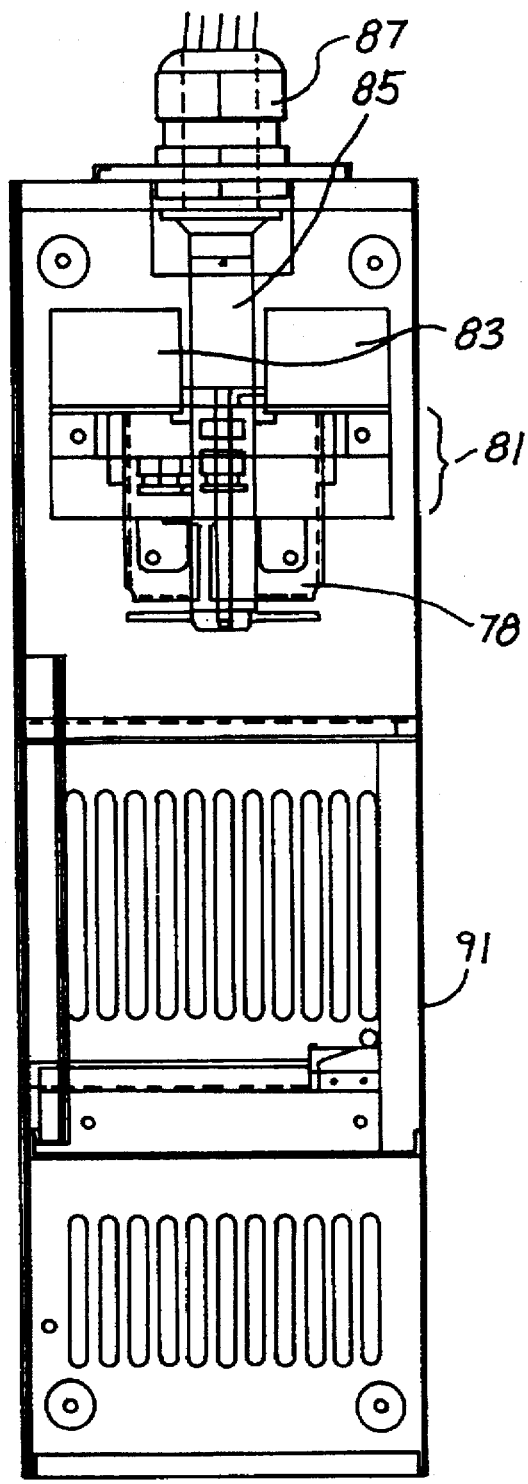

FIGS. 4a–4c illustrate the light source portion 60 of the illumination system of the presently preferred embodiment coupled to the delivery portion 62. FIG. 4a illustrates a side view of the illumination system of the present invention, and FIG. 4b illustrates a bottom view of the illumination system of the present invention. A bulb 73 fits within a socket mount 75 and comprises an illuminating portion, which is surrounded by the illumination reflector 77 of the present invention. The illumination reflector 77 of the present invention directs light from the bulb 73 through the mounting structure 78 and into the color wheels 81. Motors 83 drive the color wheels 81, and the light from the bulb 73 enters into an elongate light guide after passing through the color wheels 81. The elongate light guide preferably comprises a mixing rod 85, but may alternatively comprise any other type of light guide. A nut 87 is used to secure the light guides 89 to the housing 91 of the light source portion 60. The distal end of the illumination system, located opposite the optical fibers 89, comprises a power outlet 93 and a number of controls 95, as illustrated in FIG. 4c. FIG. 5 illustrates a cross-sectional view of the illumination reflector 77 of the presently preferred embodiment, which differs from conventional illumination reflectors by having a computer-generated curvature, which maximizes reflections of light from the bulb 73 into the color wheels 81. The illumination reflector 77 comprises a focal point 129, which is arbitrarily defined along the axis 131. The illumination reflector 77 comprises two curved surfaces 133 and 135, which preferably terminate at a two degree draft angle defining the straight surfaces 137 and 139, respectively. The straight surfaces 137 and 139 facilitate manufacturing and assembly convenience, but are not required. The illumination reflector 77 is preferably manufactured using a technique of nickel deposition or spinning. The illumination reflector 77 is then coated with aluminum for enhanced reflectivity.

An important aspect of the invention, which substantially improves the efficiency of the inventive system, is the use of non-classical, non-conic sections in the design of the illumination reflector 14. In the prior art, in contrast, classical conic sections are typically used in illumination reflector design, to create elliptical or parabolic reflectors. By way of background, classical conic sections are so-named because they can be generated (and perhaps more importantly, visualized) by imagining the plane that would be exposed by slicing through a circular section cone. For example, if such a cone is sliced through with a cut that is exactly perpendicular to the long axis of the cone, the resulting exposed plane is a circle. This is the simplest example of a conic section. Like the other conic sections, the circle can be described algebraically, in this case by the expression:

$$(x^2+y^2)^{1/2}=r \qquad (1)$$

wherein r is the radius of the circle, x is the x-coordinate value of the radius, and y is the y-coordinate value of the radius. In other words, the radius magnitude of the circle is always equal to the square root of the sum of the squares of its x-y coordinate values. The properties which this confers on the circle is that it has a single focal point equidistant from the focus of its circumference points, and that focus is in the center. This characteristic can be quite useful in optics.

If the slicing plane of the theoretical cone were to be tilted away from the perpendicular to the axis, other classical conic shapes are generated, not much more complex in mathematical description than the circle, but with ever more intriguing properties. From the standpoint of the history of optical design, two of the most important are the ellipse and the parabola.

The ellipse is a closed oval, and can be imagined by looking at the shape the edge of a circular coin makes as it is progressively tilted with respect to the observer's line of sight. The ellipse has the properties of having two focal points, or foci, both located along the line bisecting the ellipse's long axis (the circle is actually a special case of the ellipse, where the two foci are superimposed on one another, occupying the same point in space). The optical properties of an ellipse are such that any rays of light originating from exactly the point of focus on one side of the ellipse will be brought exactly to convergence at the complementary focus location, irrespective of their direction of origin.

Unlike the ellipse, the parabola has an open-figure shape. It is generated by slicing the cone along a line parallel to its long axis, all the way down to its base. The resulting shape has a vertex at the small end and an open mouth opposite. The parabola has but a single focus. Its optical properties are such that a ray of light leaving the exact point of focus and bouncing off the surface of a parabolic reflector will exit the open mouth going exactly parallel to the long axis of the parabola, no matter where the ray strikes the reflector. Flashlight reflectors are often parabolic; by collimating the light (i.e. making all the rays travel parallel paths), the flashlight beam can be directed where it is needed and deliver the most light to the area of interest, instead of illuminating a large area dimly, as a non-directed bulb would do.

As a collector of light, the parabola has the ability to take collimated light directed toward it and concentrate that light at the focus point. This makes parabolic shapes useful for solar energy collectors.

The inventors have discovered, however, that the problem with using classical elliptical and parabolic reflectors, as contemplated in the prior art, is that, while the above analysis is done based upon ideal assumptions; i.e. that the light source occupies a "point" in space in the purest mathematical sense, in that it is dimensionless. If a light source used to illuminate an elliptical or parabolic reflector could occupy a dimensional space of zero, the easily-described, well-behaved "ideal" properties of these shapes would be realized. However such a light source is impossible in the physical world; a light source of zero dimension would, by definition, be infinitely bright. In the physical world, a light source is a very real, three dimensional object, whether it is the tungsten filament of an incandescent lamp, the arc of an arc lamp, or the glowing surface of a fluorescent lamp. Compared to the theoretically ideal "point source", all of these emitters of light are not only large, but generally of complex, and sometimes bizarre, shape.

What this means is that an "ideal" conic or parabolic reflector using a "real" light source not only does not conform to its theoretically predicted performance, but often diverges wildly from the expected behavior. In the prior art, this discrepancy between the theoretical and the realized behavior of conic-shape-based reflectors is just a tough fact of life. No good analytical tools have existed to help understand it, and no design tools existed to help overcome it.

The inventive new non-traditional approach utilizes non-conic sections. The designer is freed from the artifice of employing classical, easily-described shapes whose real-world performance may be fatally compromised, and given the freedom to use non-classical shapes, difficult to describe mathematically but amenable to analysis by the considerable number-crunching power of modern personal computers.

Thus, the inventive method for fabricating the reflector 14 shown in FIGS. 1 and 2 begins with the mapping of the complex radiation patters of the real lamp 12 to be utilized in the particular apparatus. In a customized application, the lamp actually used in each individual device might actually be individually mapped. However, more typically, a particular manufacturer's lamp, designed by model number, is mapped, and the vagaries between individual lamps of a particular model or type of lamp, typically quite small, are ignored for the sake of manufacturing practicality and reasonable cost.

In the presently preferred embodiment, a 375 watt bulb 73 is used. The 375 watt bulb of the presently preferred embodiment is disclosed in U.S. Pat. No. 5,268,613, which is licensed to Sylvania and USHIO. Other bulbs may be used, as long as the model or product number of the specific bulb is noted for easy future reference.

Mapping in this sense, means to generate a collection of spatial intensity distribution measurements at a constant radial distance from the lamp, and storing the data in a computer storage location. This is done by moving a calibrated imaging detector array around the source in spherical coordinates until a detailed data file is obtained, point-by-point, of the lamp's specific radiation patterns. This detailed file does not really care about the relative "idealness" of the source; rather, the file contains a description of the radiation patterns emitted by the source, which are, by definition, what the reflector surface will actually "see".

Once the mapping process is complete, computer software is used to play the file containing the lamp's complex three-space emission pattern against the surface of any arbitrarily-defined reflector surface, whether a classic conic section or not, whether round (a surface of rotation) or not, whether comprised of smooth curves or an array of discrete facts. A focal point is defined on the surface, and the lamp is simulated to be placed at the focal point. The results of playing the lamp's real radiation patterns against the real reflector surface yields a highly accurate prediction of exactly what the resulting radiation product will look like at any point in space. The prediction can include the light intensity at any point, the rate of change of intensity between arbitrary points in the field, the angles of incidence of light through a given point, and other relevant measurements. This analytical power affords the ability to tailor the lamp/reflector combination to best satisfy the illumination requirements of the particular application, both in spatial intensity and angular distribution.

According to one specific implementation of the presently preferred embodiment, the above-mentioned 375 watt bulb is used in connection with the above-described method to generate an illumination reflector 77 having an optimized curvature. The dimensions of the curvature are expressed below in z and y coordinates, where the y coordinates are measured along an axis 131 (FIG. 5) that extends perpendicularly to the base of the illumination reflector 77 and through the bulb 73 (FIG. 4). The z coordinates are expressed in radial distances from the y axis. The specific coordinates for the illumination reflector 77 corresponding to the 375 watt Phillips bulb are reproduced below:

| | |
|---|---|
| −8.578028e−001 | 4.000000e−001 |
| −8.564562e−001 | 4.048450e−001 |
| −8.550922e−001 | 4.096916e−001 |
| −8.537107e−001 | 4.145397e−001 |
| −8.523117e−001 | 4.193893e−001 |
| −8.508951e−001 | 4.242408e−001 |
| −8.494609e−001 | 4.290938e−001 |
| −8.480090e−001 | 4.339482e−001 |
| −8.465393e−001 | 4.388045e−001 |
| −8.450518e−001 | 4.436622e−001 |
| −8.435464e−001 | 4.485217e−001 |
| −8.420231e−001 | 4.533829e−001 |

-continued

| | |
|---|---|
| −8.404818e−001 | 4.582459e−001 |
| −8.389226e−001 | 4.631103e−001 |
| −8.373452e−001 | 4.679767e−001 |
| −8.357496e−001 | 4.728448e−001 |
| −8.341358e−001 | 4.777145e−001 |
| −8.325039e−001 | 4.825859e−001 |
| −8.308535e−001 | 4.874594e−001 |
| −8.291848e−001 | 4.923343e−001 |
| −8.274976e−001 | 4.972111e−001 |
| −8.257919e−001 | 5.020898e−001 |
| −8.240677e−001 | 5.069702e−001 |
| −8.223247e−001 | 5.118526e−001 |
| −8.205631e−001 | 5.167366e−001 |
| −8.187829e−001 | 5.216226e−001 |
| −8.169837e−001 | 5.265102e−001 |
| −8.151656e−001 | 5.313998e−001 |
| −8.133286e−001 | 5.362914e−001 |
| −8.114725e−001 | 5.411850e−001 |
| −8.095973e−001 | 5.460802e−001 |
| −8.077028e−001 | 5.509773e−001 |
| −8.057892e−001 | 5.558766e−001 |
| −8.038563e−001 | 5.607775e−001 |
| −8.019039e−001 | 5.656805e−001 |
| −7.999321e−001 | 5.705855e−001 |
| −7.979406e−001 | 5.754923e−001 |
| −7.959297e−001 | 5.804012e−001 |
| −7.938990e−001 | 5.853119e−001 |
| −7.918487e−001 | 5.902247e−001 |
| −7.897784e−001 | 5.951397e−001 |
| −7.876881e−001 | 6.000565e−001 |
| −7.855780e−001 | 6.049752e−001 |
| −7.834478e−001 | 6.098961e−001 |
| −7.812973e−001 | 6.148189e−001 |
| −7.791267e−001 | 6.197438e−001 |
| −7.769356e−001 | 6.246705e−001 |
| −7.747242e−001 | 6.295995e−001 |
| −7.724923e−001 | 6.345303e−001 |
| −7.702399e−001 | 6.394633e−001 |
| −7.679667e−001 | 6.443984e−001 |
| −7.656728e−001 | 6.493355e−001 |
| −7.633581e−001 | 6.542745e−001 |
| −7.610223e−001 | 6.592157e−001 |
| −7.586657e−001 | 6.641589e−001 |
| −7.562880e−001 | 6.691042e−001 |
| −7.538891e−001 | 6.740518e−001 |
| −7.514688e−001 | 6.790012e−001 |
| −7.490273e−001 | 6.839527e−001 |
| −7.465643e−001 | 6.889065e−001 |
| −7.440798e−001 | 6.938622e−001 |
| −7.415735e−001 | 6.988201e−001 |
| −7.390455e−001 | 7.037799e−001 |
| −7.364956e−001 | 7.087418e−001 |
| −7.339239e−001 | 7.137057e−001 |
| −7.313300e−001 | 7.186719e−001 |
| −7.287140e−001 | 7.236401e−001 |
| −7.260758e−001 | 7.286103e−001 |
| −7.234153e−001 | 7.335827e−001 |
| −7.207323e−001 | 7.385571e−001 |
| −7.180267e−001 | 7.435335e−001 |
| −7.152985e−001 | 7.485121e−001 |
| −7.125477e−001 | 7.534928e−001 |
| −7.097738e−001 | 7.584754e−001 |
| −7.069770e−001 | 7.634603e−001 |
| −7.041572e−001 | 7.684470e−001 |
| −7.013142e−001 | 7.734359e−001 |
| −6.984479e−001 | 7.784268e−001 |
| −6.955581e−001 | 7.834198e−001 |
| −6.926449e−001 | 7.884148e−001 |
| −6.897081e−001 | 7.934119e−001 |
| −6.867475e−001 | 7.984109e−001 |
| −6.837630e−001 | 8.034120e−001 |
| −6.807546e−001 | 8.084151e−001 |
| −6.777222e−001 | 8.134201e−001 |
| −6.746655e−001 | 8.184273e−001 |
| −6.715845e−001 | 8.234363e−001 |
| −6.684790e−001 | 8.284472e−001 |
| −6.653489e−001 | 8.334602e−001 |
| −6.621943e−001 | 8.384751e−001 |
| −6.590148e−001 | 8.434920e−001 |
| −6.558104e−001 | 8.485107e−001 |

| -continued | | | -continued | |
|---|---|---|---|---|
| −6.525808e−001 | 8.535314e−001 | | −3.113543e−001 | 1.248714e+000 |
| −6.493261e−001 | 8.585539e−001 | | −3.075577e−001 | 1.252089e+000 |
| −6.460462e−001 | 8.635783e−001 | | −3.037436e−001 | 1.255464e+000 |
| −6.427408e−001 | 8.686047e−001 | | −2.999123e−001 | 1.258837e+000 |
| −6.394098e−001 | 8.736329e−001 | | −2.960637e−001 | 1.262209e+000 |
| −6.360531e−001 | 8.786628e−001 | | −2.921975e−001 | 1.265580e+000 |
| −6.326706e−001 | 8.836946e−001 | | −2.883138e−001 | 1.268950e+000 |
| −6.292621e−001 | 8.887283e−001 | | −2.844127e−001 | 1.272320e+000 |
| −6.258276e−001 | 8.937636e−001 | | −2.804937e−001 | 1.275688e+000 |
| −6.223668e−001 | 8.988008e−001 | | −2.765571e−001 | 1.279055e+000 |
| −6.188796e−001 | 9.038396e−001 | | −2.726027e−001 | 1.282421e+000 |
| −6.153660e−001 | 9.088803e−001 | | −2.686304e−001 | 1.285786e+000 |
| −6.118258e−001 | 9.139226e−001 | | −2.646402e−001 | 1.289149e+000 |
| −6.082588e−001 | 9.189666e−001 | | −2.606320e−001 | 1.292511e+000 |
| −6.046648e−001 | 9.240124e−001 | | −2.566057e−001 | 1.295872e+000 |
| −6.010438e−001 | 9.290596e−001 | | −2.525613e−001 | 1.299232e+000 |
| −5.973957e−001 | 9.341085e−001 | | −2.484987e−001 | 1.302590e+000 |
| −5.937201e−001 | 9.391590e−001 | | −2.444177e−001 | 1.305947e+000 |
| −5.900171e−001 | 9.442111e−001 | | −2.403184e−001 | 1.309303e+000 |
| −5.862864e−001 | 9.492648e−001 | | −2.362008e−001 | 1.312657e+000 |
| −5.825280e−001 | 9.543200e−001 | | −2.320646e−001 | 1.316009e+000 |
| −5.787417e−001 | 9.593766e−001 | | −2.279098e−001 | 1.319360e+000 |
| −5.749273e−001 | 9.644347e−001 | | −2.237365e−001 | 1.322710e+000 |
| −5.710847e−001 | 9.694942e−001 | | −2.195444e−001 | 1.326057e+000 |
| −5.672137e−001 | 9.745551e−001 | | −2.153334e−001 | 1.329404e+000 |
| −5.633141e−001 | 9.796174e−001 | | −2.111037e−001 | 1.332748e+000 |
| −5.593859e−001 | 9.846811e−001 | | −2.068551e−001 | 1.336091e+000 |
| −5.554288e−001 | 9.897460e−001 | | −2.025873e−001 | 1.339432e+000 |
| −5.514428e−001 | 9.948212e−001 | | −1.983006e−001 | 1.342771e+000 |
| −5.474276e−001 | 9.998797e−001 | | −1.939948e−001 | 1.346108e+000 |
| −5.433831e−001 | 1.004948e+000 | | −1.896695e−001 | 1.349444e+000 |
| −5.393091e−001 | 1.010018e+000 | | −1.853252e−001 | 1.352777e+000 |
| −5.352054e−001 | 1.015089e+000 | | −1.809614e−001 | 1.356109e+000 |
| −5.310721e−001 | 1.020161e+000 | | −1.765781e−001 | 1.359439e+000 |
| −5.269087e−001 | 1.025234e+000 | | −1.721754e−001 | 1.362766e+000 |
| −5.227154e−001 | 1.030308e+000 | | −1.677531e−001 | 1.366091e+000 |
| −5.184916e−001 | 1.035383e+000 | | −1.633109e−001 | 1.369415e+000 |
| −5.142374e−001 | 1.040459e+000 | | −1.588492e−001 | 1.372736e+000 |
| −5.099525e−001 | 1.045536e+000 | | −1.543677e−001 | 1.376054e+000 |
| −5.056368e−001 | 1.050614e+000 | | −1.498661e−001 | 1.379371e+000 |
| −5.012902e−001 | 1.055693e+000 | | −1.453446e−001 | 1.382685e+000 |
| −4.969125e−001 | 1.060772e+000 | | −1.408032e−001 | 1.385997e+000 |
| −4.925034e−001 | 1.065852e+000 | | −1.362416e−001 | 1.389306e+000 |
| −4.880629e−001 | 1.070933e+000 | | −1.316596e−001 | 1.392613e+000 |
| −4.835908e−001 | 1.076014e+000 | | −1.270575e−001 | 1.395917e+000 |
| −4.790868e−001 | 1.081096e+000 | | −1.224350e−001 | 1.399219e+000 |
| −4.745507e−001 | 1.086178e+000 | | −1.177920e−001 | 1.402518e+000 |
| −4.699825e−001 | 1.091261e+000 | | −1.131285e−001 | 1.405814e+000 |
| −4.653819e−001 | 1.096344e+000 | | −1.084445e−001 | 1.409108e+000 |
| −4.607488e−001 | 1.101428e+000 | | −1.037397e−001 | 1.412399e+000 |
| −4.560829e−001 | 1.106512e+000 | | −9.901421e−002 | 1.415687e+000 |
| −4.513841e−001 | 1.111596e+000 | | −9.426792e−002 | 1.418972e+000 |
| −4.466521e−001 | 1.116681e+000 | | −8.950055e−002 | 1.422254e+000 |
| −4.418869e−001 | 1.121765e+000 | | −8.471235e−002 | 1.425533e+000 |
| −4.370881e−001 | 1.126850e+000 | | −7.990309e−002 | 1.428810e+000 |
| −4.322557e−001 | 1.131934e+000 | | −7.507250e−002 | 1.432083e+000 |
| −4.273894e−001 | 1.137019e+000 | | −7.022085e−002 | 1.435353e+000 |
| −4.224890e−001 | 1.142103e+000 | | −6.534789e−002 | 1.438619e+000 |
| −4.175543e−001 | 1.147187e+000 | | −6.045336e−002 | 1.441883e+000 |
| −4.125853e−001 | 1.152271e+000 | | −5.553752e−002 | 1.445143e+000 |
| −4.075815e−001 | 1.157355e+000 | | −5.060014e−002 | 1.448399e+000 |
| −4.025430e−001 | 1.162438e+000 | | −4.564094e−002 | 1.451653e+000 |
| −3.974693e−001 | 1.167520e+000 | | −4.066020e−002 | 1.454902e+000 |
| −3.923604e−001 | 1.172602e+000 | | −3.565765e−002 | 1.458149e+000 |
| −3.872160e−001 | 1.177684e+000 | | −3.063305e−002 | 1.461391e+000 |
| −3.820359e−001 | 1.182765e+000 | | −2.558666e−002 | 1.464630e+000 |
| −3.768200e−001 | 1.187845e+000 | | −2.051822e−002 | 1.467865e+000 |
| −3.715680e−001 | 1.192924e+000 | | −1.542766e−002 | 1.471097e+000 |
| −3.662798e−001 | 1.198002e+000 | | −1.031470e−002 | 1.474324e+000 |
| −3.609550e−001 | 1.203080e+000 | | −5.179628e−003 | 1.477547e+000 |
| −3.555934e−001 | 1.208156e+000 | | −2.217694e−005 | 1.480767e+000 |
| −3.501950e−001 | 1.213230e+000 | | 5.157912e−003 | 1.483982e+000 |
| −3.447595e−001 | 1.218304e+000 | | 1.036037e−002 | 1.487193e+000 |
| −3.392866e−001 | 1.223377e+000 | | 1.558545e−002 | 1.490400e+000 |
| −3.337762e−001 | 1.228447e+000 | | 2.083343e−002 | 1.493603e+000 |
| −3.300815e−001 | 1.231827e+600 | | 2.610402e−002 | 1.496801e+000 |
| −3.263700e−001 | 1.235206e+000 | | 3.139749e−002 | 1.499995e+000 |
| −3.226417e−001 | 1.238585e+000 | | 3.671410e−002 | 1.503185e+000 |
| −3.188964e−001 | 1.241962e+000 | | 4.205358e−002 | 1.506370e+000 |
| −3.151339e−001 | 1.245339e+000 | | 4.741620e−002 | 1.509550e+000 |

| | | | | |
|---|---|---|---|---|
| 5.280222e−002 | 1.512726e+000 | | 5.664993e−001 | 1.743623e+000 |
| 5.821135e−002 | 1.515897e+000 | | 5.740494e−001 | 1.746098e+000 |
| 6.364386e−002 | 1.519063e+000 | | 5.816298e−001 | 1.748559e+000 |
| 6.910004e−002 | 1.522224e+000 | | 5.892400e−001 | 1.751006e+000 |
| 7.457959e−002 | 1.525380e+000 | | 5.968804e−001 | 1.753440e+000 |
| 8.008279e−002 | 1.528531e+000 | | 6.045514e−001 | 1.755859e+000 |
| 8.560989e−002 | 1.531677e+000 | | 6.122525e−001 | 1.758263e+000 |
| 9.116063e−002 | 1.534818e+000 | | 6.199840e−001 | 1.760653e+000 |
| 9.673527e−002 | 1.537953e+000 | | 6.277462e−001 | 1.763029e+000 |
| 1.023339e−001 | 1.541083e+000 | | 6.355388e−001 | 1.765389e+000 |
| 1.079568e−001 | 1.544208e+000 | | 6.433620e−001 | 1.767734e+000 |
| 1.136036e−001 | 1.547327e+000 | | 6.512161e−001 | 1.770064e+000 |
| 1.192747e−001 | 1.550440e+000 | | 6.591006e−001 | 1.772378e+000 |
| 1.249703e−001 | 1.553548e+000 | | 6.670160e−001 | 1.774677e+000 |
| 1.306901e−001 | 1.556650e+000 | | 6.749624e−001 | 1.776960e+000 |
| 1.364345e−001 | 1.559746e+000 | | 6.829396e−001 | 1.779227e+000 |
| 1.422036e−001 | 1.562836e+000 | | 6.909478e−001 | 1.781479e+000 |
| 1.479972e−001 | 1.565920e+000 | | 6.989872e−001 | 1.783713e+000 |
| 1.538156e−001 | 1.568998e+000 | | 7.070576e−001 | 1.785931e+000 |
| 1.596590e−001 | 1.572070e+000 | | 7.151592e−001 | 1.788133e+000 |
| 1.655271e−001 | 1.575136e+000 | | 7.232920e−001 | 1.790318e+000 |
| 1.714203e−001 | 1.578195e+000 | | 7.314563e−001 | 1.792486e+000 |
| 1.773387e−001 | 1.581247e+000 | | 7.396517e−001 | 1.794636e+000 |
| 1.832822e−001 | 1.584293e+000 | | 7.478784e−001 | 1.796769e+000 |
| 1.892510e−001 | 1.587333e+000 | | 7.561370e−001 | 1.798885e+000 |
| 1.952453e−001 | 1.590365e+000 | | 7.644268e−001 | 1.800982e+000 |
| 2.012649e−001 | 1.593391e+000 | | 7.727481e−001 | 1.803062e+000 |
| 2.073100e−001 | 1.596410e+000 | | 7.811013e−001 | 1.805123e+000 |
| 2.133809e−001 | 1.599422e+000 | | 7.894859e−001 | 1.807166e+000 |
| 2.194774e−001 | 1.602426e+000 | | 7.979023e−001 | 1.809191e+000 |
| 2.255996e−001 | 1.605424e+000 | | 8.063506e−001 | 1.811197e+000 |
| 2.317477e−001 | 1.608413e+000 | | 8.148305e−001 | 1.813184e+000 |
| 2.379220e−001 | 1.611396e+000 | | 8.233423e−001 | 1.815152e+000 |
| 2.441222e−001 | 1.614371e+000 | | 8.318862e−001 | 1.817100e+000 |
| 2.503486e−001 | 1.617339e+000 | | 8.404614e−001 | 1.819029e+000 |
| 2.566013e−001 | 1.620298e+000 | | 8.490692e−001 | 1.820938e+000 |
| 2.628802e−001 | 1.623250e+000 | | 8.577090e−001 | 1.822827e+000 |
| 2.691855e−001 | 1.626194e+000 | | 8.663803e−001 | 1.824695e+000 |
| 2.755175e−001 | 1.629130e+000 | | 8.750843e−001 | 1.826544e+000 |
| 2.818758e−001 | 1.632058e+000 | | 8.838204e−001 | 1.828372e+000 |
| 2.882609e−001 | 1.634977e+000 | | 8.925881e−001 | 1.830179e+000 |
| 2.946729e−001 | 1.637888e+000 | | 9.013885e−001 | 1.831965e+000 |
| 3.011115e−001 | 1.640791e+000 | | 9.102212e−001 | 1.833730e+000 |
| 3.075771e−001 | 1.643685e+000 | | 9.190854e−001 | 1.835473e+000 |
| 3.140698e−001 | 1.646571e+000 | | 9.279826e−001 | 1.837194e+000 |
| 3.205895e−001 | 1.649447e+000 | | 9.369121e−001 | 1.838894e+000 |
| 3.271363e−001 | 1.652315e+000 | | 9.458733e−001 | 1.840571e+000 |
| 3.337106e−001 | 1.655173e+000 | | 9.548675e−001 | 1.842226e+000 |
| 3.403121e−001 | 1.658023e+000 | | 9.638941e−001 | 1.843859e+000 |
| 3.469410e−001 | 1.660863e+000 | | 9.729524e−001 | 1.845469e+000 |
| 3.535976e−001 | 1.663694e+000 | | 9.820437e−001 | 1.847055e+000 |
| 3.602817e−001 | 1.666515e+000 | | 9.911675e−001 | 1.848619e+000 |
| 3.669933e−001 | 1.669327e+000 | | 1.000323e+000 | 1.850159e+000 |
| 3.737331e−001 | 1.672129e+000 | | 1.009512e+000 | 1.851675e+000 |
| 3.805004e−001 | 1.674921e+000 | | 1.018733e+000 | 1.853167e+000 |
| 3.872957e−001 | 1.677703e+000 | | 1.027986e+000 | 1.854635e+000 |
| 3.941190e−001 | 1.680475e+000 | | 1.037272e+000 | 1.856078e+000 |
| 4.009706e−001 | 1.683236e+000 | | 1.046590e+000 | 1.857497e+000 |
| 4.078503e−001 | 1.685988e+000 | | 1.055941e+000 | 1.858891e+000 |
| 4.147581e−001 | 1.688729e+000 | | 1.065324e+000 | 1.860259e+000 |
| 4.216946e−001 | 1.691459e+000 | | 1.074740e+000 | 1.861602e+000 |
| 4.286593e−001 | 1.694178e+000 | | 1.084188e+000 | 1.862920e+000 |
| 4.356525e−001 | 1.696887e+000 | | 1.093669e+000 | 1.864211e+000 |
| 4.426745e−061 | 1.699585e+000 | | 1.103182e+000 | 1.865477e+000 |
| 4.497250e−001 | 1.702271e+000 | | 1.112727e+000 | 1.866715e+000 |
| 4.568043e−001 | 1.704946e+000 | | 1.122305e+000 | 1.867928e+000 |
| 4.639126e−001 | 1.707610e+000 | | 1.131916e+000 | 1.869113e+000 |
| 4.710496e−001 | 1.710262e+000 | | 1.141558e+000 | 1.870271e+000 |
| 4.782156e−001 | 1.712902e+000 | | 1.151234e+000 | 1.871401e+000 |
| 4.854110e−001 | 1.715531e+000 | | 1.160941e+000 | 1.872504e+000 |
| 4.926352e−001 | 1.718148e+000 | | 1.170681e+000 | 1.873579e+000 |
| 4.998888e−001 | 1.720752e+000 | | 1.180454e+000 | 1.874626e+000 |
| 5.071718e−001 | 1.723344e+000 | | 1.190258e+000 | 1.875644e+000 |
| 5.144840e−001 | 1.725924e+000 | | 1.200095e+000 | 1.876633e+000 |
| 5.218257e−001 | 1.728492e+000 | | 1.209964e+000 | 1.877594e+000 |
| 5.291972e−001 | 1.731046e+000 | | 1.219865e+000 | 1.878525e+000 |
| 5.365980e−001 | 1.733588e+000 | | 1.229798e+000 | 1.879426e+000 |
| 5.440285e−001 | 1.736116e+000 | | 1.239764e+000 | 1.880298e+000 |
| 5.514888e−001 | 1.738632e+000 | | 1.244758e+000 | 1.880722e+000 |
| 5.589792e−001 | 1.741134e+000 | | 1.249761e+000 | 1.881139e+000 |

-continued

| | |
|---|---|
| 1.254772e+000 | 1.881548e+000 |
| 1.259790e+000 | 1.881950e+000 |
| 1.264817e+000 | 1.882344e+000 |
| 1.269852e+000 | 1.882730e+000 |
| 1.274894e+000 | 1.883109e+000 |
| 1.279945e+000 | 1.883479e+000 |
| 1.285004e+000 | 1.883842e+000 |
| 1.290070e+000 | 1.884197e+000 |
| 1.295144e+000 | 1.884544e+000 |
| 1.300227e+000 | 1.884884e+000 |
| 1.305317e+000 | 1.885215e+000 |
| 1.310415e+000 | 1.885538e+000 |
| 1.315522e+000 | 1.885854e+000 |
| 1.320636e+000 | 1.886161e+000 |
| 1.325758e+000 | 1.886460e+000. |

Looking at the z and y coordinates reproduced above, the first number in each pair of coordinates is the z axis coordinate with zero at the focal point. The second number is the y axis coordinate. The first number in the above list, for example, comprises a y value of 0.4 resulting in a 0.8 inch diameter hole at the base of the illumination reflector 77. The final y value in the above list is nearly 2 inches resulting in a diameter of the illumination reflector 77 of nearly 4 inches. The focal point 129 of the illumination reflector 77 corresponds to the point −2.217694e−005, 1.480767e+000 in the above list of coordinates. The computer-generated curvature of the illumination reflector 77 of the presently preferred embodiment is capable of generating improvements in luminous flux over conventional illumination reflectors.

Referring again particularly to FIGS. 1 and 2, reference numeral 14 denotes an exemplary non-conic illumination reflector which might be generated using the method described above. Reference numeral 14a denotes, in contrast, a classic conic illumination reflector, having a circular cross section (FIG. 2) which might be used in the prior art. The deviation of the shape of reflector 14 from a surface of revolution of a classic conic section has been exaggerated for illustrative purposes.

Another advantage of the non-conic illumination reflector 14 designed and fabricated in accordance with the principles of this invention is the ability to utilize higher intensity light at the light guide end face without burning the light guide ends. Optical beams do not naturally have a uniform intensity distribution across the beam. Imperfections in optical systems can produce peaks and other nonuniformities. Even in ideal systems the intensity distribution will tend toward a Gaussian distribution. A Gaussian beam has a peaked distribution described by $$I = e^{-x} \quad (2)$$

where I is the intensity of the beam and x is the distance from the center of the beam. Lasers are naturally Gaussian. Other light beams will approach Gaussian as they are diffracted in an optical system.

The existence of intensity peaks when light is launched into a light guide can result in light guide burning. This in turn limits the maximum power that can be safely launched into a light guide. For example, when a beam of light is directed onto the end of a bundle of light guides the center light guide(s) tend to burn because intensity of the light is peaked near the center.

The non-conic illumination reflector shapes generated by the inventive methods not only compensate for the shape of the lamp but also produce a more uniform intensity distribution at the light guide end face. This permits the safe use of higher intensity levels without burning the light guide ends.

It should be noted that this technique for mapping the radiation patterns of a light source, and developing a database from which a reflector may be designed for an illumination system, is not limited to light guide optic applications. It is also useful for other types of illumination applications, such as projection systems, for example. Furthermore, the database which is developed from the mapping process may be used to fabricate customized lenses as well as reflectors, if desired.

Although exemplary embodiments of the invention have been shown and described, many changes, modifications and substitutions may be made by one having ordinary skill in the art without necessarily departing from the spirit and scope of this invention.

We claim:

1. An illumination system, comprising:
   an illumination source;
   at least one color wheel adapted for receiving light from the illumination source; and
   an illumination reflector having a computer-generated reflecting surface, the illumination reflector comprising a non-circular cross-section and being non-elliptical and non-parabolic, and the illumination reflector being adapted for receiving illumination from the illumination source and redirecting the illumination to the at least one color wheel.

2. The illumination system as recited in claim 1, the illumination source comprising a 375 watt lamp.

3. The illumination system as recited in claim 1, further comprising a mixing rod adapted for receiving light from the at least one color wheel, and the computer generated reflecting surface increasing a luminous flux of the illumination system.

4. The illumination system as recited in claim 3, further comprising at least one light guide adapted for receiving light from the mixing rod.

5. The illumination system as recited in claim 4, the at least one light guide comprising a bundle of light guides.

6. The illumination system as recited in claim 1, the illumination reflector comprising nickel.

7. The illumination system as recited in claim 5, the illumination reflector being manufactured by at least one of nickel forming and spinning.

8. The illumination system as recited in claim 1, the computer-generated reflecting surface comprising a curved surface.

9. An illumination system, comprising:
   an illumination source;
   at least one color wheel adapted for receiving light from the illumination source;
   an elongate light guide adapted for receiving light from the color wheel; and
   an illumination reflector having a computer-generated curve, the illumination reflector having a non-circular cross-section and being non-elliptical and non-parabolic, the illumination reflector being adapted for receiving illumination from the illumination source and redirecting the illumination to the at least one color wheel.

10. The illumination system as recited in claim 9, the elongate light guide comprising a mixing rod, and the illumination reflector being adapted for redirecting substantially a maximum amount of the illumination to the at least one color wheel.

11. The illumination system as recited in claim 10, further comprising at least one light guide adapted for receiving light from the mixing rod.

12. An illumination reflector adapted for use in an illumination system, the illumination system having an illumination source and at least one color wheel adapted for receiving light from the illumination source, the illumination reflector comprising:

a non-circular cross-section; and a computer-generated reflecting surface adapted for maximizing reflections of radiation patterns of the illumination source into the at least one color wheel, the computer-generated reflecting surface comprising a non-circular cross-section and being non-elliptical and non-parabolic, and the computer-generated reflecting surface being based on both measured radiation patterns of the illumination source and computer simulations of different reflecting surfaces for maximizing the reflections of the radiation patterns into the at least one color wheel.

13. The illumination reflector as recited in claim 12, further being adapted for receiving illumination from the illumination source and redirecting the illumination to the at least one color wheel.

14. The illumination reflector as recited in claim 12, further comprising a mixing rod adapted for receiving light from the at least one color wheel.

15. The illumination system as recited in claim 14, the computer-generated reflecting surface increasing a luminous flux of the illumination system.

16. The illumination system as recited in claim 15, further comprising at least one of a light guide and a bundle of light guides adapted for receiving light from the mixing rod.

17. The illumination system as recited in claim 12, the illumination source comprising a 375 Watt bulb.

18. An illumination reflector adapted for maximizing reflections from an illumination source onto at least one color wheel, the illumination reflector having a computer-generated reflecting surface, which comprises a non-circular cross-section and which is non-elliptical and non-parabolic, the illumination reflector being expressible in z and y coordinates, the y-coordinates being measured along an axis that extends perpendicularly to a portion of the computer-generated reflecting surface and through the illumination source, and the z-coordinates expressing radial distances from the y axis, the z and y coordinates of the computer-generated reflecting surface comprising the following specific z and y values, respectively, with a plus or minus twenty percent tolerance for each specific value:

| | |
|---|---|
| −8.578028e−001 | 4.000000e−001 |
| −8.564562e−001 | 4.048450e−001 |
| −8.550922e−001 | 4.096916e−001 |
| −8.537107e−001 | 4.145397e−001 |
| −8.523117e−001 | 4.193893e−001 |
| −8.508951e−001 | 4.242408e−001 |
| −8.494609e−001 | 4.290938e−001 |
| −8.480090e−001 | 4.339482e−001 |
| −8.465393e−001 | 4.388045e−001 |
| −8.450518e−001 | 4.436622e−001 |
| −8.435464e−001 | 4.485217e−001 |
| −8.420231e−001 | 4.533829e−001 |
| −8.404818e−001 | 4.582459e−001 |
| −8.389226e−001 | 4.631103e−001 |
| −8.373452e−001 | 4.679767e−001 |
| −8.357496e−001 | 4.728448e−001 |
| −8.341358e−001 | 4.777145e−001 |
| −8.325039e−001 | 4.825859e−001 |
| −8.308535e−001 | 4.874594e−001 |
| −8.291848e−001 | 4.923343e−001 |
| −8.274976e−001 | 4.972111e−001 |
| −8.257919e−001 | 5.020898e−001 |

-continued

| | |
|---|---|
| −8.240677e−001 | 5.069702e−001 |
| −8.223247e−001 | 5.118526e−001 |
| −8.205631e−001 | 5.167366e−001 |
| −8.187829e−001 | 5.216226e−001 |
| −8.169837e−001 | 5.265102e−001 |
| −8.151656e−001 | 5.313998e−001 |
| −8.133286e−001 | 5.362914e−001 |
| −8.114725e−001 | 5.411850e−001 |
| −8.095973e−001 | 5.460802e−001 |
| −8.077028e−001 | 5.509773e−001 |
| −8.057892e−001 | 5.558766e−001 |
| −8.038563e−001 | 5.607775e−001 |
| −8.019039e−001 | 5.656805e−001 |
| −7.999321e−001 | 5.705855e−001 |
| −7.979406e−001 | 5.754923e−001 |
| −7.959297e−001 | 5.804012e−001 |
| −7.938990e−001 | 5.853119e−001 |
| −7.918487e−001 | 5.902247e−001 |
| −7.897784e−001 | 5.951397e−001 |
| −7.876881e−001 | 6.000565e−001 |
| −7.855780e−001 | 6.049752e−001 |
| −7.834478e−001 | 6.098961e−001 |
| −7.812973e−001 | 6.148189e−001 |
| −7.791267e−001 | 6.197438e−001 |
| −7.769356e−001 | 6.246705e−001 |
| −7.747242e−001 | 6.295995e−001 |
| −7.724923e−001 | 6.345303e−001 |
| −7.702399e−001 | 6.394633e−001 |
| −7.679667e−001 | 6.443984e−001 |
| −7.656728e−001 | 6.493355e−001 |
| −7.633581e−001 | 6.542745e−001 |
| −7.610223e−001 | 6.592157e−001 |
| −7.586657e−001 | 6.641589e−001 |
| −7.562880e−001 | 6.691042e−001 |
| −7.538891e−001 | 6.740518e−001 |
| −7.514688e−001 | 6.790012e−001 |
| −7.490273e−001 | 6.839527e−001 |
| −7.465643e−001 | 6.889065e−001 |
| −7.440798e−001 | 6.938622e−001 |
| −7.415735e−001 | 6.988201e−001 |
| −7.390455e−001 | 7.037799e−001 |
| −7.364956e−001 | 7.087418e−001 |
| −7.339239e−001 | 7.137057e−001 |
| −7.313300e−001 | 7.186719e−001 |
| −7.287140e−001 | 7.236401e−001 |
| −7.260758e−001 | 7.286103e−001 |
| −7.234153e−001 | 7.335827e−001 |
| −7.207323e−001 | 7.385571e−001 |
| −7.180267e−001 | 7.435335e−001 |
| −7.152985e−001 | 7.485121e−001 |
| −7.125477e−001 | 7.534928e−001 |
| −7.097738e−001 | 7.584754e−001 |
| −7.069770e−001 | 7.634603e−001 |
| −7.041572e−001 | 7.684470e−001 |
| −7.013142e−001 | 7.734359e−001 |
| −6.984479e−001 | 7.784268e−001 |
| −6.955581e−001 | 7.834198e−001 |
| −6.926449e−001 | 7.884148e−001 |
| −6.897081e−001 | 7.934119e−001 |
| −6.867475e−001 | 7.984109e−001 |
| −6.837630e−001 | 8.034120e−001 |
| −6.807546e−001 | 8.084151e−001 |
| −6.777222e−001 | 8.134201e−001 |
| −6.746655e−001 | 8.184273e−001 |
| −6.715845e−001 | 8.234363e−001 |
| −6.684790e−001 | 8.284472e−001 |
| −6.653489e−001 | 8.334602e−001 |
| −6.621943e−001 | 8.384751e−001 |
| −6.590148e−001 | 8.434920e−001 |
| −6.558104e−001 | 8.485107e−001 |
| −6.525808e−001 | 8.535314e−001 |
| −6.493261e−001 | 8.585539e−001 |
| −6.460462e−001 | 8.635783e−001 |
| −6.427408e−001 | 8.686047e−001 |
| −6.394098e−001 | 8.736329e−001 |
| −6.360531e−001 | 8.786628e−001 |
| −6.326706e−001 | 9.836946e−001 |
| −6.292621e−001 | 8.887283e−001 |
| −6.258276e−001 | 8.937636e−001 |
| −6.223668e−001 | 8.988008e−001 |

| | | | |
|---|---|---|---|
| −6.188796e−001 | 9.038396e−001 | −2.726027e−001 | 1.282421e+000 |
| −6.153660e−001 | 9.088803e−001 | −2.686304e−001 | 1.285786e+000 |
| −6.118258e−001 | 9.139226e−001 | −2.646402e−001 | 1.289149e+000 |
| −6.082588e−001 | 9.189666e−001 | −2.606320e−001 | 1.292511e+000 |
| −6.046648e−001 | 9.240124e−001 | −2.566057e−001 | 1.295872e+000 |
| −6.010438e−001 | 9.290596e−001 | −2.525613e−001 | 1.299232e+000 |
| −5.973957e−001 | 9.341085e−001 | −2.484987e−001 | 1.302590e+000 |
| −5.937201e−001 | 9.391590e−001 | −2.444177e−001 | 1.305947e+000 |
| −5.900171e−001 | 9.442111e−001 | −2.403184e−001 | 1.309303e+000 |
| −5.862864e−001 | 9.492648e−001 | −2.362008e−001 | 1.312657e+000 |
| −5.825280e−001 | 9.543200e−001 | −2.320646e−001 | 1.316009e+000 |
| −5.787417e−001 | 9.593766e−001 | −2.279098e−001 | 1.319360e+000 |
| −5.749273e−001 | 9.644347e−001 | −2.237365e−001 | 1.322710e+000 |
| −5.710847e−001 | 9.694942e−001 | −2.195444e−001 | 1.326057e+000 |
| −5.672137e−001 | 9.745551e−001 | −2.153334e−001 | 1.329404e+000 |
| −5.633141e−001 | 9.796174e−001 | −2.111037e−001 | 1.332748e+000 |
| −5.593859e−001 | 9.846811e−001 | −2.068551e−001 | 1.336091e+000 |
| −5.554288e−001 | 9.897460e−001 | −2.025873e−001 | 1.339432e+000 |
| −5.514428e−001 | 9.948121e−001 | −1.983006e−001 | 1.342771e+000 |
| −5.474276e−001 | 9.998797e−001 | −1.939948e−001 | 1.346108e+000 |
| −5.433831e−001 | 1.004948e+000 | −1.896695e−001 | 1.349444e+000 |
| −5.393091e−001 | 1.010018e+000 | −1.853252e−001 | 1.352777e+000 |
| −5.352054e−001 | 1.015089e+000 | −1.809614e−001 | 1.356109e+000 |
| −5.310721e−001 | 1.020161e+000 | −1.765781e−001 | 1.359439e+000 |
| −5.269087e−001 | 1.025234e+000 | −1.721754e−001 | 1.362766e+000 |
| −5.227154e−001 | 1.030308e+000 | −1.677531e−001 | 1.366091e+000 |
| −5.184916e−001 | 1.035383e+000 | −1.633109e−001 | 1.369415e+000 |
| −5.142374e−001 | 1.040459e+000 | −1.588492e−001 | 1.372736e+000 |
| −5.099525e−001 | 1.045536e+000 | −1.543677e−001 | 1.376054e+000 |
| −5.056368e−001 | 1.050614e+000 | −1.498661e−001 | 1.379371e+000 |
| −5.012902e−001 | 1.055693e+000 | −1.453446e−001 | 1.382685e+000 |
| −4.969125e−001 | 1.060772e+000 | −1.408032e−001 | 1.385997e+000 |
| −4.925034e−001 | 1.065852e+000 | −1.362416e−001 | 1.389306e+000 |
| −4.880629e−001 | 1.070933e+000 | −1.316596e−001 | 1.392613e+000 |
| −4.835908e−001 | 1.076014e+000 | −1.270575e−001 | 1.395917e+000 |
| −4.790868e−001 | 1.081096e+000 | −1.224350e−001 | 1.399219e+000 |
| −4.745507e−001 | 1.086178e+000 | −1.177920e−001 | 1.402518e+000 |
| −4.699825e−001 | 1.091261e+000 | −1.131285e−001 | 1.405814e+000 |
| −4.653819e−001 | 1.096344e+000 | −1.084445e−001 | 1.409108e+000 |
| −4.607488e−001 | 1.101428e+000 | −1.037397e−001 | 1.412399e+000 |
| −4.560829e−001 | 1.106512e+000 | −9.901421e−002 | 1.415687e+000 |
| −4.513841e−001 | 1.111596e+000 | −9.426792e−002 | 1.418972e+000 |
| −4.466521e−001 | 1.116681e+000 | −8.950055e−002 | 1.422254e+000 |
| −4.418869e−001 | 1.121765e+000 | −8.471235e−002 | 1.425533e+000 |
| −4.370881e−001 | 1.126850e+000 | −7.990309e−002 | 1.428810e+000 |
| −4.322557e−001 | 1.131934e+000 | −7.507250e−002 | 1.432083e+000 |
| −4.273894e−001 | 1.137019e+000 | −7.022085e−002 | 1.435353e+000 |
| −4.224890e−001 | 1.142103e+000 | −6.534789e−002 | 1.438619e+000 |
| −4.175543e−001 | 1.147187e+000 | −6.045336e−002 | 1.441883e+000 |
| −4.125853e−001 | 1.152271e+000 | −5.553752e−002 | 1.445143e+000 |
| −4.075815e−001 | 1.157355e+000 | −5.060014e−002 | 1.448399e+000 |
| −4.025430e−001 | 1.162438e+000 | −4.564094e−002 | 1.451653e+000 |
| −3.974693e−001 | 1.167520e+000 | −4.066020e−002 | 1.454902e+000 |
| −3.923604e−001 | 1.172602e+000 | −3.565765e−002 | 1.458149e+000 |
| −3.872160e−001 | 1.177684e+000 | −3.063305e−002 | 1.461391e+000 |
| −3.820359e−001 | 1.182765e+000 | −2.558666e−002 | 1.464630e+000 |
| −3.768200e−001 | 1.187845e+000 | −2.051822e−002 | 1.467865e+000 |
| −3.715680e−001 | 1.192924e+000 | −1.542766e−002 | 1.471097e+000 |
| −3.662798e−001 | 1.198002e+000 | −1.031470e−002 | 1.474324e+000 |
| −3.609550e−001 | 1.203080e+000 | −5.179628e−003 | 1.477547e+000 |
| −3.555934e−001 | 1.208156e+000 | −2.217694e−005 | 1.480767e+000 |
| −3.501950e−001 | 1.213230e+000 | 5.157912e−003 | 1.483982e+000 |
| −3.447595e−001 | 1.218304e+000 | 1.036037e−002 | 1.487193e+000 |
| −3.392866e−001 | 1.223377e+000 | 1.558545e−002 | 1.490400e+000 |
| −3.337762e−001 | 1.228447e+000 | 2.083343e−002 | 1.493603e+000 |
| −3.300815e−001 | 1.231827e+000 | 2.610402e−002 | 1.496801e+000 |
| −3.263700e−001 | 1.235206e+000 | 3.139749e−002 | 1.499995e+000 |
| −3.226417e−001 | 1.238585e+000 | 3.671410e−002 | 1.503185e+000 |
| −3.188964e−001 | 1.241962e+000 | 4.205358e−002 | 1.506370e+000 |
| −3.151339e−001 | 1.245339e+000 | 4.741620e−002 | 1.509550e+000 |
| −3.113543e−001 | 1.248714e+000 | 5.280222e−002 | 1.512726e+000 |
| −3.075577e−001 | 1.252089e+000 | 5.821135e−002 | 1.515897e+000 |
| −3.037436e−001 | 1.255464e+000 | 6.364386e−002 | 1.519063e+000 |
| −2.999123e−001 | 1.258837e+000 | 6.910004e−002 | 1.522224e+000 |
| −2.960637e−001 | 1.262209e+000 | 7.457959e−002 | 1.525380e+000 |
| −2.921975e−001 | 1.265580e+000 | 8.008279e−002 | 1.528531e+000 |
| −2.883138e−001 | 1.268950e+000 | 8.560989e−002 | 1.531677e+000 |
| −2.844127e−001 | 1.272320e+000 | 9.116063e−002 | 1.534818e+000 |
| −2.804937e−001 | 1.275688e+000 | 9.673527e−002 | 1.537953e+000 |
| −2.765571e−001 | 1.279055e+000 | 1.023339e−001 | 1.541083e+000 |

| | | | | |
|---|---|---|---|---|
| 1.079568e−001 | 1.544208e+000 | | 6.433620e−001 | 1.767734e+000 |
| 1.136036e−001 | 1.547327e+000 | | 6.512161e−001 | 1.770064e+000 |
| 1.192747e−001 | 1.550440e+000 | | 6.591006e−001 | 1.772378e+000 |
| 1.249703e−001 | 1.553548e+000 | | 6.670160e−001 | 1.774677e+000 |
| 1.306901e−001 | 1.556650e+000 | | 6.749624e−001 | 1.776960e+000 |
| 1.364345e−001 | 1.559746e+000 | | 6.829396e−001 | 1.779227e+000 |
| 1.422036e−001 | 1.562836e+000 | | 6.909478e−001 | 1.781479e+000 |
| 1.479972e−001 | 1.565920e+000 | | 6.989872e−001 | 1.783713e+000 |
| 1.538156e−001 | 1.568998e+000 | | 7.070576e−001 | 1.785931e+000 |
| 1.596590e−001 | 1.572070e+000 | | 7.151592e−001 | 1.788133e+000 |
| 1.655271e−001 | 1.575136e+000 | | 7.232920e−001 | 1.790318e+000 |
| 1.714203e−001 | 1.578195e+000 | | 7.314563e−001 | 1.792486e+000 |
| 1.773387e−001 | 1.581247e+000 | | 7.396517e−001 | 1.794636e+000 |
| 1.832822e−001 | 1.584293e+000 | | 7.478784e−001 | 1.796769e+000 |
| 1.892510e−001 | 1.587333e+000 | | 7.561370e−001 | 1.798885e+000 |
| 1.952453e−001 | 1.590365e+000 | | 7.644268e−001 | 1.800982e+000 |
| 2.012649e−001 | 1.593391e+000 | | 7.727481e−001 | 1.803062e+000 |
| 2.073100e−001 | 1.596410e+000 | | 7.811013e−001 | 1.805123e+000 |
| 2.133809e−001 | 1.599422e+000 | | 7.894859e−001 | 1.807166e+000 |
| 2.194774e−001 | 1.602426e+000 | | 7.979023e−001 | 1.809191e+000 |
| 2.255996e−001 | 1.605424e+000 | | 8.063506e−001 | 1.811197e+000 |
| 2.317477e−001 | 1.608413e+000 | | 8.148305e−001 | 1.813184e+000 |
| 2.379220e−001 | 1.611396e+000 | | 8.233423e−001 | 1.815152e+000 |
| 2.441222e−001 | 1.614371e+000 | | 8.318862e−001 | 1.817100e+000 |
| 2.503486e−001 | 1.617339e+000 | | 8.404614e−001 | 1.819029e+000 |
| 2.566013e−001 | 1.620298e+000 | | 8.490692e−001 | 1.820938e+000 |
| 2.628802e−001 | 1.623250e+000 | | 8.577090e−001 | 1.822827e+000 |
| 2.691855e−001 | 1.626194e+000 | | 8.663803e−001 | 1.824695e+000 |
| 2.755175e−001 | 1.629130e+000 | | 8.750843e−001 | 1.826544e+000 |
| 2.818758e−001 | 1.632058e+000 | | 8.838204e−001 | 1.828372e+000 |
| 2.882609e−001 | 1.634977e+000 | | 8.925881e−001 | 1.830179e+000 |
| 2.946729e−001 | 1.637888e+000 | | 9.013885e−001 | 1.831965e+000 |
| 3.011115e−001 | 1.640791e+000 | | 9.102212e−001 | 1.833730e+000 |
| 3.075771e−001 | 1.643685e+000 | | 9.190854e−001 | 1.835473e+000 |
| 3.140698e−001 | 1.646571e+000 | | 9.279826e−001 | 1.837194e+000 |
| 3.205895e−001 | 1.649447e+000 | | 9.369121e−001 | 1.838894e+000 |
| 3.271363e−001 | 1.652315e+000 | | 9.458733e−001 | 1.840571e+000 |
| 3.337106e−001 | 1.655173e+000 | | 9.548675e−001 | 1.842226e+000 |
| 3.403121e−001 | 1.658023e+000 | | 9.638941e−001 | 1.843859e+000 |
| 3.469410e−001 | 1.660863e+000 | | 9.729524e−001 | 1.845469e+000 |
| 3.535976e−001 | 1.663694e+000 | | 9.820437e−001 | 1.847055e+000 |
| 3.602817e−001 | 1.666515e+000 | | 9.911675e−001 | 1.848619e+000 |
| 3.669933e−001 | 1.669327e+000 | | 1.000323e+000 | 1.850159e+000 |
| 3.737331e−001 | 1.672129e+000 | | 1.009512e+000 | 1.851675e+000 |
| 3.805004e−001 | 1.674921e+000 | | 1.018733e+000 | 1.853167e+000 |
| 3.872957e−001 | 1.677703e+000 | | 1.027986e+000 | 1.854635e+000 |
| 3.941190e−001 | 1.680475e+000 | | 1.037272e+000 | 1.856078e+000 |
| 4.009706e−001 | 1.683236e+000 | | 1.046590e+000 | 1.857497e+000 |
| 4.078503e−001 | 1.685988e+000 | | 1.055941e+000 | 1.858891e+000 |
| 4.147581e−001 | 1.688729e+000 | | 1.065324e+000 | 1.860259e+000 |
| 4.216946e−001 | 1.691459e+000 | | 1.074740e+000 | 1.861602e+000 |
| 4.286593e−001 | 1.694178e+000 | | 1.084188e+000 | 1.862920e+000 |
| 4.356525e−001 | 1.696887e+000 | | 1.093669e+000 | 1.864211e+000 |
| 4.426745e−001 | 1.699585e+000 | | 1.103182e+000 | 1.865477e+000 |
| 4.497250e−001 | 1.702271e+000 | | 1.112727e+000 | 1.866715e+000 |
| 4.568043e−001 | 1.704946e+000 | | 1.122305e+000 | 1.867928e+000 |
| 4.639126e−001 | 1.707610e+000 | | 1.131916e+000 | 1.869113e+000 |
| 4.710496e−001 | 1.710262e+000 | | 1.141558e+000 | 1.870271e+000 |
| 4.782156e−001 | 1.712902e+000 | | 1.151234e+000 | 1.871401e+000 |
| 4.854110e−001 | 1.715531e+000 | | 1.160941e+000 | 1.872504e+000 |
| 4.926352e−001 | 1.718148e+000 | | 1.170681e+000 | 1.873579e+000 |
| 4.998888e−001 | 1.720752e+000 | | 1.180454e+000 | 1.874626e+000 |
| 5.071718e−001 | 1.723344e+000 | | 1.190258e+000 | 1.875644e+000 |
| 5.144840e−001 | 1.725924e+000 | | 1.200095e+000 | 1.876633e+000 |
| 5.218257e−001 | 1.728492e+000 | | 1.209964e+000 | 1.877594e+000 |
| 5.291972e−001 | 1.731046e+000 | | 1.219865e+000 | 1.878525e+000 |
| 5.365980e−001 | 1.733588e+000 | | 1.229798e+000 | 1.879426e+000 |
| 5.440285e−001 | 1.736116e+000 | | 1.239764e+000 | 1.880298e+000 |
| 5.514888e−001 | 1.738632e+000 | | 1.244758e+000 | 1.880722e+000 |
| 5.589792e−001 | 1.741134e+000 | | 1.249761e+000 | 1.881139e+000 |
| 5.664993e−001 | 1.743623e+000 | | 1.254772e+000 | 1.881548e+000 |
| 5.740494e−001 | 1.746098e+000 | | 1.259790e+000 | 1.881950e+000 |
| 5.816298e−001 | 1.748559e+000 | | 1.264817e+000 | 1.882344e+000 |
| 5.892400e−001 | 1.751006e+000 | | 1.269852e+000 | 1.882730e+000 |
| 5.968804e−001 | 1.753440e+000 | | 1.274894e+000 | 1.883109e+000 |
| 6.045514e−001 | 1.755859e+000 | | 1.279945e+000 | 1.883479e+000 |
| 6.122525e−001 | 1.758263e+000 | | 1.285004e+000 | 1.883842e+000 |
| 6.199840e−001 | 1.760653e+000 | | 1.290070e+000 | 1.884197e+000 |
| 6.277462e−001 | 1.763029e+000 | | 1.295144e+000 | 1.884544e+000 |
| 6.355388e−001 | 1.765389e+000 | | 1.300227e+000 | 1.884884e+000 |

-continued

| | |
|---|---|
| 1.305317e+000 | 1.885215e+000 |
| 1.310415e+000 | 1.885538e+000 |
| 1.315522e+000 | 1.885854e+000 |
| 1.320636e+000 | 1.886161e+000 |
| 1.325758e+000 | 1.886460e+000. |

19. The illumination reflector as recited in claim 18, further being adapted for use in an illumination system, the illumination system having an illumination source and a mixing rod adapted for receiving light from the color wheel, the reflecting surface of the illumination reflector being adapted for maximizing reflections of radiation patterns of the illumination source into the color wheel.

20. An illumination system comprising an illumination source and an elongate light guide adapted for receiving light from the illumination source, the improvement comprising an illumination reflector having a reflecting surface, the reflecting surface comprising a non-circular cross-section and being non-elliptical and non-parabolic, and the reflecting surface being adapted for receiving illumination from the illumination source and redirecting substantially a maximum amount of the illumination to the elongate light guide.

21. The illumination system as recited in claim 20, the reflecting surface being computer generated.

22. An illumination system, comprising:

an illumination source having a characteristic radiation pattern;

at least one color wheel adapted for receiving light from the illumination source; and an illumination reflector having a reflecting surface that is customized for generating a predetermined radiation product upon receipt of the characteristic radiation pattern, the illumination reflector comprising a non-circular cross-section and being non-elliptical and non-parabolic, and the illumination reflector being adapted for directing at least a portion of the predetermined radiation product to the at least one color wheel.

23. The illumination system as recited in claim 22, the reflecting surface being computer generated.

24. The illumination system as recited in claim 22, the illumination reflector being adapted for redirecting substantially a maximum amount of the characteristic radiation pattern to the at least one color wheel.

25. The illumination system as recited in claim 22, further comprising an optical heat-resistant glass adapted for receiving light from the at least one color wheel.

* * * * *